United States Patent [19]
Portman

[11] 3,806,868
[45] Apr. 23, 1974

[54] TURN SIGNAL REMINDER DEVICE

[76] Inventor: Clement A. Portman, 12545 Sarah St., Los Angeles, Calif. 91604

[22] Filed: Feb. 17, 1972

[21] Appl. No.: 227,059

[52] U.S. Cl.............. 340.52 D, 307/141.4, 340/56, 340/75
[51] Int. Cl.............................................. B60q 1/00
[58] Field of Search......... 340/52 D, 53, 56, 73, 63, 340/66, 75, 52; 307/31, 33, 34, 139, 141.4, 248, 317, 284; 331/145, 149

[56] References Cited
UNITED STATES PATENTS

| | | | |
|---|---|---|---|
| 3,187,271 | 6/1965 | De Vries | 331/149 |
| 3,376,548 | 4/1968 | Jabbar et al. | 340/75 |
| 3,445,810 | 5/1969 | Donohoo | 340/56 |
| 3,643,214 | 2/1972 | Chan | 340/53 |

Primary Examiner—Donald J. Yusko
Assistant Examiner—Joseph E. Nowicki
Attorney, Agent, or Firm—Roger A. Marrs

[57] ABSTRACT

A device which includes a first timing circuit operative in response to the vehicle's flashing unit to actuate a trigger circuit into activating a switch after a predetermined time period. The switch energizes a second timing circuit that preempts the first timing circuit so that the trigger circuit operates an audio frequency oscillator. An audio alarm circuit is coupled to the output of the trigger circuit so as to sound an audible signal for alerting the driver.

6 Claims, 2 Drawing Figures

TURN SIGNAL REMINDER DEVICE

BACKGROUND OF THE INVENTION

1. Field of the Invention

This invention relates to directional turn signals for vehicles and, more particularly, to a novel device for alerting the driver to the fact that the turn signal indicators are continuing to flash, although a longer-than-normal time period has elapsed since the turn signal unit was activated.

2. Description of the Prior Art

It has been the conventional practice to install a turn signal system on vehicles employing turn signal switches with mechanical means by which a turn signal is set manually by the operator of the vehicle for making the turns and by which the signal is automatically cancelled after the vehicle has completed its turn. These mechanical means include reset members operated by the steering mechanism of the vehicle to cancel an indicated turn signal when the wheels of the vehicle are turned to a straight-ahead position after completion of the indicated turn. Because of mechanical considerations and to prevent premature cancelling of the indicated turn signal resulting from a slight reversal of the steering mechanism during turning movement of the vehicle, the turn signal mechanical means are usually constructed to require a substantial degree of movement of the steering mechanism away from its straight-ahead position before its return movement is effective to cancel the indicated turn signal. Consequently, a turn signal is often indicated after a completed turn. This condition is likely to occur on multi-lane highways where it is customary to use the turn signal when changing from one lane to another while passing another vehicle. The same condition may result from other driving situations such as the turning of the vehicle onto the obliquely curved approaches and exits of roadways. The continued indication of a turn signal when one is not intended creates an obvious driving hazard.

Attempts have been made to provide warning or alerting devices on vehicles that operate in conjunction with turn signal indicators adapted to alert the driver of the vehicle of turn signal system operation beyond a reasonable time period. Some such warning devices are disclosed in U.S. Pat. Nos. 3,315,226; 3,289,158 and 3,376,548. Difficulties and problems have been encountered with such conventional warning devices that stem largely from the fact that circuit operation of these devices requires connection to a normally open flasher unit. Modern vehicles employ flasher units which are of the normally closed type and, therefore, major modification would be needed to successfully employ these conventional devices. Also, circuits are used in employing resistors which are undesirable because of the relatively large wattage rating required to handle the total signal-like current. Furthermore, in some instances the voltage drop across selected resistors would alter the electro-thermal characteristics of a typical normally closed bi-metal flashing unit which would render the unit inoperative. In still other warning devices of the prior art, no precise means are provided for control of the time delay and the components of the devices are large and heavy so that the physical size and weight of the unit is unacceptable for modern day usage.

Therefore, it can be seen that a long standing need has existed to provide a warning or alerting device operated by a conventional flasher unit which incorporates precision timing control and relatively few parts of lightweight and compact assembly.

SUMMARY OF THE INVENTION

Accordingly, the difficulties and problems encountered with conventional warning or alert devices noted above are obviated by the present invention which provides, in combination with a conventional vehicle flasher unit of the normally closed contact type, timer means operable in response to activation of the flasher unit for establishing the tolling of a predetermined time period and switch means energized by the timer means via a trigger circuit for actuating an audible alarm.

In one form of the invention, an audio frequency generator or second timing circuit is operably coupled between the switch means and the trigger circuit whereby the trigger circuit functions as an audio frequency oscillator to operate the alarm.

Therefore, it is among the primary objects of the present invention to provide a vehicle warning or alerting system which provides an audible reminder signal that the conventional turn signal indicators are activated only after such indicators have been in operation for a given predetermined time period.

Another object of the present invention is to provide a novel vehicle turn signal reminder device operable in conjunction with a conventional flasher unit which will provide an audible signal only after a predetermined period of time following initial operation of the turn signal flasher unit.

Still another object of the present invention is to provide a novel electronic circuit incorporating solid state components which is effective to remind a vehicle operator that the vehicle turn signal system is functioning beyond a normal period of time.

A further object of the present invention is to provide a novel turn indicator alarm system incorporating a solid state device adapted to be actuated by conventional flasher units having normally closed type contacts.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
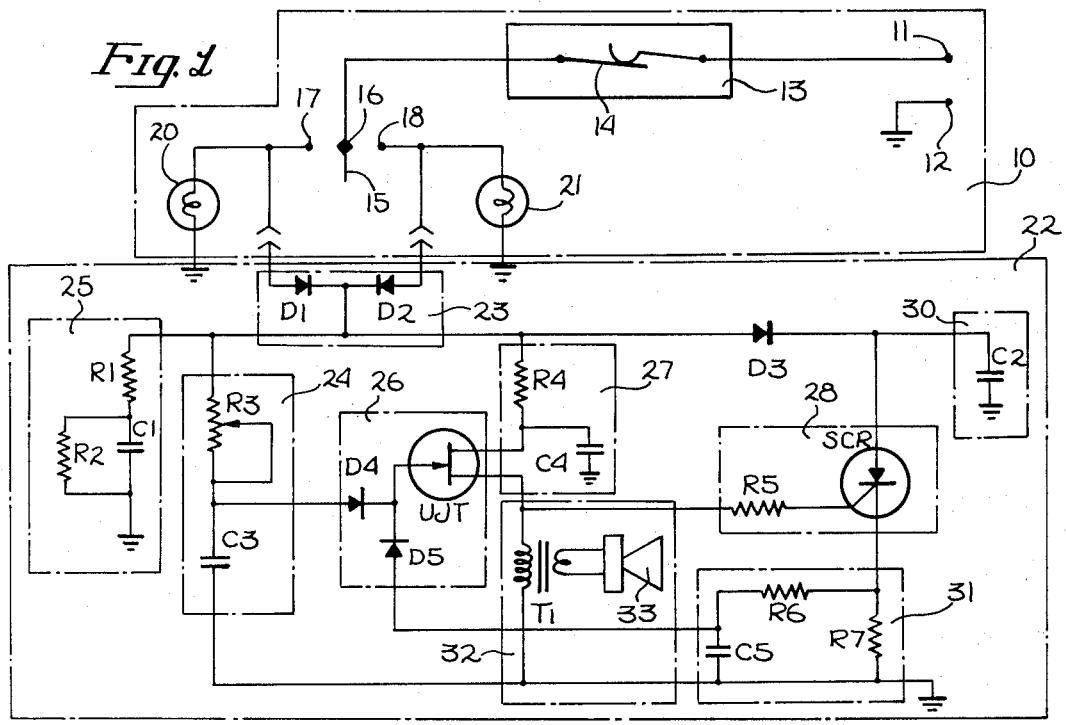
FIG. 1 is a schematic diagram of the novel turn signal alert or remaining circuit incorporating the present invention.

Referring to FIG. 1, the novel vehicle turn signal warning or alert device of the present invention is illustrated in schematic form. A conventional vehicle turn signal indicator system is illustrated within the broken lines indicated by arrow 10 and includes a pair of terminals 11 and 12 operably connected to a suitable source of potential such as the vehicle 12-volt battery. In series with the positive terminal 11, there is provided a flasher unit 13 of conventional construction comprising a bimetal element or switch 14 that is in its normally closed condition. The flasher unit 13 is in series with a mechanical turn signal lever 15 which includes a central contact 16 adapted to engage with either contact 17 or 18 associated with a left turn signal lamp 20 and a right turn signal lamp 21 respectively. Thus, when the turn signal lever 15 is positioned so that central contact 16 engages with fixed contact 18, current will be supplied to energize lamp 21 signifying to the driver and to those following him that he intends to make a right-hand turn. The lamp 21 will remain energized until operation of the bi-metal switch 14 which will break or open the circuit momentarily to cause the lamp 21 to blink or flash. The turn signal warning or alert device of the present invention is indicated within the broken line box by numeral 22.

The device is coupled to the conventional vehicle turn signal indicator system 10 by means of a diode network 23. A first time circuit 24 connected thereto establishes a time delay for providing a predetermined period of time before permitting the device to function. The timing circuit includes variable resistor $R_3$ and capacitor $C_3$. Coupled to the first timing circuit, there is provided a filter circuit 25 which includes resistor $R_1$ in series and resistor $R_2$ in parallel with capacitor $C_1$. The filter circuit serves as a holding and storage network that maintains the flow of current into timing circuit 24.

Coupled to the output of the first timing circuit there is provided a trigger circuit 26 which includes diode $D_4$, diode $D_5$ and a uni-junction transistor indicated by the initials UJT. The trigger circuit 26 is coupled to a filter or transient pulse suppressor 27 which includes resistor $R_4$ and capacitor $C_4$. The output of the trigger circuit is connected to a switch circuit 28 which includes resistor $R_5$ and a silicon controlled rectifier indicated by the initials SCR. A holding circuit 30 comprising capacitor $C_2$ holds a positive voltage on the anode of the SCR. Connected to the output of the SCR or switch circuit there is provided a second timing circuit 31 which operates as an audio frequency generator and includes resistors $R_6$, $R_7$ and capacitor $C_5$. The output of the second timing circuit 31 is connected back to the trigger circuit 26 so that the UJT will operate as an audio frequency oscillator oscillating at the audio frequency set by the components of the second timing circuit 31. Also connected to the output of the trigger circuit, there is provided an alarm circuit 32 which includes a transformer $T_1$ and a loudspeaker 33 operably connected to the secondary of the transformer.

Diodes $D_4$ and $D_5$ provide electrical isolation between the two timing circuits while diode $D_3$ provides isolation between the two storage capacitors $C_1$ and $C_2$ of holding circuits 25 and 30 respectively.

Resistors $R_1$ and $R_2$, in conjunction with capacitor $C_1$, form an integrating filter network to smooth the flow of current into the first timing circuit 24. $C_4$ is a transient suppressor to prevent premature firing of the UJT.

Resistor $R_7$ establishes a holding current path for the SCR and the value of resistor $R_7$ is chosen in conjunction with capacitor $C_2$ to maintain sufficient holding current for the SCR when the flashing unit is opened.

The rise and fall of voltage across resistor $R_7$ during flashing operations is of such magnitude as to trigger the UJT oscillator on and off in sequence with the flashing unit. This provides an intermittent and attention alerting signal via the loudspeaker 33.

In actual operation, when the turn signal lever 15 is switched to either the left or right contacts 17 or 18, diode $D_1$ or $D_2$ will become forward biased and current will flow into the timing circuit 24. Current will also flow into storage capacitor $C_1$ and $C_2$ of holding circuits 25 and 30 respectively. During the intervals when the bi-metal flashing unit 13 is opened, capacitor $C_1$ maintains the flow of current into resistor $R_3$ and capacitor $C_3$ of the timing circuit 24 and capacitor $C_2$ holds a positive voltage on the anode of the SCR.

Resistor $R_3$ is initially adjusted to relate a predetermined time interval to the voltage required to trigger and operate the UJT. Resistor $R_3$ and capacitor $C_3$ provide an RC time constant which is readily adjusted by means of the variable resistor $R_3$. When the predetermined timing interval has elapsed, the UJT in trigger circuit 26 operates resulting in the appearance of a pulse across the primary of transformer $T_1$. This pulse triggers the SCR into conduction. When the SCR conducts, a voltage is developed across resistor $R_7$ in the second timing circuit 31 which is reflected in the RC time constant of resistor $R_6$ and capacitor $C_5$. Voltage from the second timing circuit is introduced to the emitter of the UJT causing the UJT to oscillate at an audio frequency rate which is determined by the RC constant of the second timing circuit 31.

The audio frequency voltage from the trigger circuit 26 now operating as an oscillator develops across transformer $T_1$ and energizes the speaker 33 which produces an intermittent audible signal. Transformer $T_1$ could be eliminated if the speaker voice coil were wound to an impedence that would match the UJT.

Thus, it is seen that control of the UJT is first established by timing circuit 24 after a time delay. This delay can be adjusted to any desired time interval and as soon as the UJT is energized, its control is preempted by the second timing circuit 31 and it becomes an audio frequency oscillator.

Figure 2:
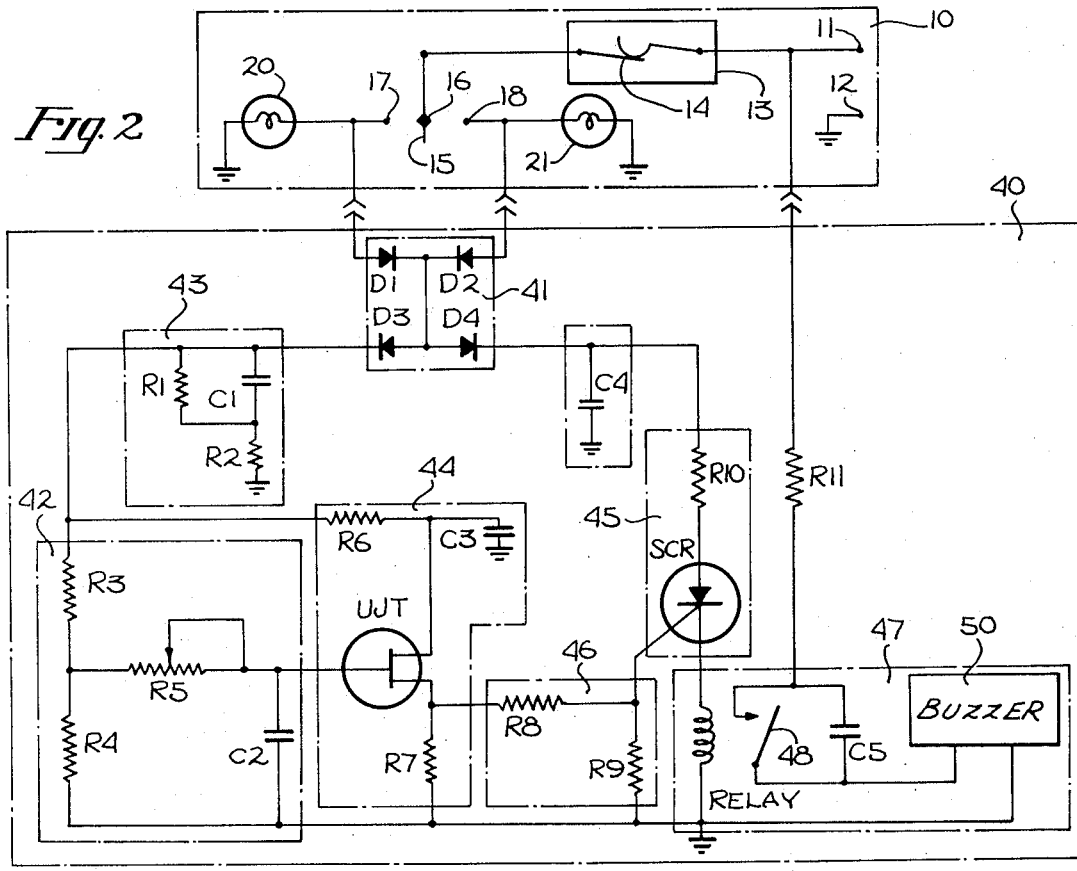
FIG. 2 is a schematic diagram of another embodiment of the present invention.

Referring now to the embodiment shown in FIG. 2, the vehicle's turn signal system, enclosed by broken lines and indicated by numeral 10, is identical to the system shown in FIG. 1. However, the alerting device of the present invention taking the form of the second embodiment or version is indicated by the numeral 40 and the components thereof are enclosed within the broken line box.

A diode network 41 interconnects the device with the vehicle turn signal system 10 and includes diodes $D_1$, $D_2$, $D_3$ and $D_4$. A timing circuit 42 is connected to the diode network 41 via a holding or storage circuit 43. The timing circuit includes an RC network comprising variable resistor $R_5$ and capacitor $C_2$. The output of the timing circuit which functions as a predetermined time delay circuit is coupled to a trigger circuit 44 having a uni-junction transistor indicated by the letters UJT. The trigger circuit, in turn, is coupled at its output to a switch 45 including a silicon controlled rectifier indicated by the initials SCR. A sensitivity control 46 is interposed between the trigger circuit and the switch circuit. The output of the switch circuit is coupled to an alarm circuit 47 which includes a relay 48 and a conventional buzzer 50 which produces an audible tone or sound.

When the vehicle's turn signal lever 15 is switched on to either the left or right indicators, diodes $D_1$ and $D_2$, plus diode $D_3$ and $D_4$ respectively, become forward biased and current flows into storage or holding capacitors $C_1$ and $C_4$. Current also flows into a relaxation oscillator circuit comprising the UJT of the trigger circuit 44, voltage divider $R_3$ and $R_4$ in the timing circuit 42 and through the RC network of the timing circuit comprising resistor $R_5$ and capacitor $C_2$. Resistor $R_5$ is adjusted to select the time interval or delay desired by relating to the amount of voltage across capacitor $C_2$ necessary to operate the UJT. If, for example, resistor $R_5$ is adjusted so that the UJT fires ninety seconds after the turn signal lever 15 is switched ON, then the pulse appearing across resistor $R_7$ will turn on the SCR, the anode of which is in a steady state forward bias from diode $D_4$ and is held in this condition by storage capacitor $C_4$.

When the SCR turns ON, the relay 48 is energized and closes the circuit from the vehicle positive source voltage at terminal 11 to the alarm buzzer. It is to be understood that other types of auditory devices may be substituted for the buzzer, if desired.

In order to maintain a continuous flow of current into the timing circuit 42 during intervals when the vehicle's bi-metal flashing unit 14 is opening, the values of capacitor $C_1$, resistors $R_1$ and $R_2$ are selected to provide a storage time constant slightly longer than the opening interval of the bi-metal flashing unit. For the same reason, the value of storage capacitor $C_4$ is selected for continuous forward bias on the anode of the SCR.

When the turn signal indicator is switched ON and OFF in normal use prior to the expiration of the predetermined time interval, capacitors $C_1$, $C_2$ and $C_4$ discharge at rates which are fast enough to preclude a build-up of the RC constant of resistor $R_5$ and capacitor $C_2$ timing voltage to a level sufficient to fire the UJT. Thus, the invention will provide no reminder, warning or alert signal if the turn signal lever is not in the ON position for the full duration of the predetermined time interval set by the RC constant of Resistor $R_5$ and capacitor $C_2$.

The particular values of resistors $R_6$ and $R_7$ are selected to provide proper pulse amplitude to operate the SCR. Capacitor $C_3$ in conjunction with resistor $R_6$ suppresses transient pulses which may inadvertently operate the SCR prematurely. Resistors $R_8$ and $R_9$ act as a voltage divider to adjust the sensitivity of the SCR switch to the pulse amplitude. Resistor $R_{10}$ limits the current through the relay coil and resistor $R_{11}$ limits the current through the buzzer. Capacitor $C_5$ provides spark relief on the relay contact points.

When installing this embodiment, only three connections and ground are required to connect the device to the wiring of any vehicle which is equipped with turn signal indicators. No modification of the vehicle's wiring circuit is necessary. For the embodiment of FIG. 1, two connections are needed.

In connection with this invention, it should be noted that the values given for the various components are not absolute and that the values will vary according to the specific parameters of the UJT and the SCR employed in the circuits. Therefore, specific component values are not listed.

In view of the foregoing, it can be seen that the reminder or warning device of the present invention greatly reduces road hazard and improves traffic safety by eliminating accidental erroneous actuation of the vehicle's turn signals beyond the normal operation time. The invention audibly warns and reminds the operator of the vehicle whenever his turn signal indicators have been left in the ON position beyond a predetermined time. A reminder takes place after the predetermined time interval, for example, ninety seconds, which commences whenever the turn signal indicators are switched ON. However, if a selected turn signal indicator is switched ON and OFF in normal use, prior to expiration of ninety seconds, no reminder is necessary and the invention will not sound an alert warning.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In combination with a vehicle turn signal system having a normally closed flasher unit, an operator alerting device comprising:
   a trigger circuit;
   a switch circuit operatively coupled to said trigger circuit;
   an alarm circuit operatively connected to said switch circuit and operated in response to conduction of said switch circuit;
   a first timing circuit including a delay network connecting said vehicle turn system to said trigger circuit operable in response to actuation of said vehicle turn system to energize said trigger circuit after a predetermined time interval whereby said alarm circuit emits an audible sound;
   a second timing circuit connected between said switch circuit and said trigger circuit and operable in response to operation of said switch circuit to drive said trigger circuit at an audio frequency whereby said alarm circuit emits an audible intermittent sound;
   said timing circuit includes an RC time constant network;
   said second timing circuit includes an RC time constant network of substantially shorter time duration than said first timing circuit;
   a diode network interconnecting said vehicle turn signal system to said first timing circuit; and
   a capacitive holding circuit connected in parallel to said diode network and said first timing circuit for maintaining a flow of current to said first timing circuit during intervals when said flasher unit is open.

2. The invention as defined in claim 1 wherein said trigger circuit includes a uni-junction transistor and said switch circuit includes a silicon controlled rectifier.

3. The invention as defined in claim 2 including a capacitive holding network connected between said diode network and said silicon controlled rectifier so that a positive voltage is placed on the anode of said silicon controlled rectifier.

4. The invention as defined in claim 3 wherein said alarm circuit includes a transformer having its primary winding connected to the output of said uni-junction transistor whereby a pulse appearing across the primary winding triggers said silicon controlled receifier into conduction and wherein the secondary winding is connected to a loudspeaker.

5. The invention as defined in claim 4 wherein said trigger circuit includes a diode isolation network between said timing circuits.

6. The invention as defined in claim 5 wherein said second timing circuit includes a resistor establishing a holding circuit path for said silicon controlled rectifier during the closing and opening of said flasher unit and whereby the rise and fall of voltage across said resistor is of sufficient magnitude as to actuate said uni-junction transistor as an oscillator.

* * * * *